Dec. 22, 1936.   A. A. KIRLEY   2,065,333
EXPANSION RIVET
Filed May 12, 1936
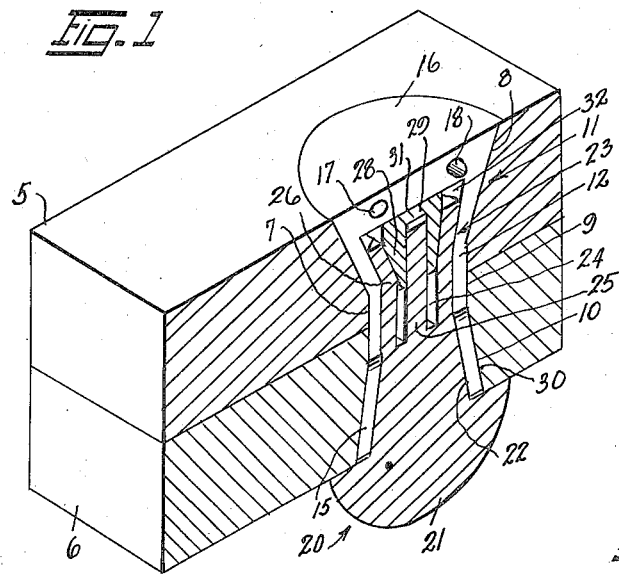
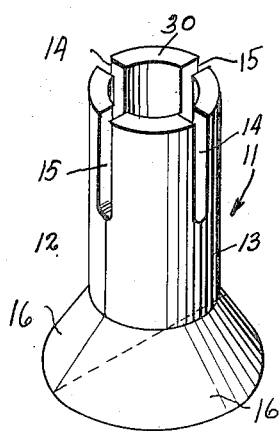
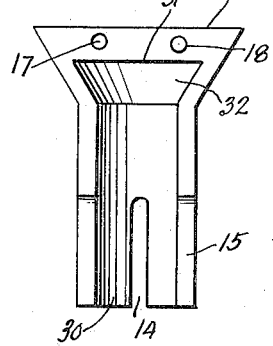
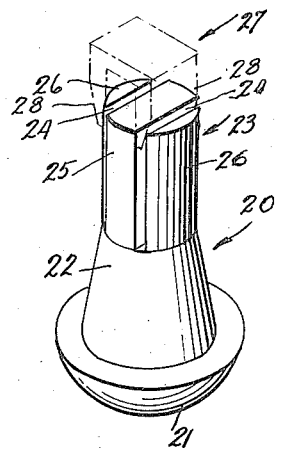
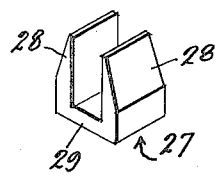
INVENTOR.
Arthur A. Kirley
BY *Maurice Block*
ATTORNEY.

Patented Dec. 22, 1936

2,065,333

UNITED STATES PATENT OFFICE 2,065,333

EXPANSION RIVET

Arthur A. Kirley, New York, N. Y.

Application May 12, 1936, Serial No. 79,229

4 Claims. (Cl. 85—39)

This invention relates to expansion rivets and has for one of its objects the provision of such a rivet which may be used cold in structural steel work and eliminate a great deal of labor and time during the riveting process.

Another object of the invention is the provision of a rivet of this nature comprising an outer split shell, an inner split bolt for expanding the shell when the bolt is driven home and a wedge-shaped member to expand the end of the split bolt during the said driving operation.

A further object of the invention is the provision of a bolt of the character described which is adaptable for use in ship construction or other structural steel work and in all places where rivets are used to connect two plates.

A still further object of the invention is the provision of such a rivet which is hard enough to prevent shearing, malleable enough for expansion and in which these qualities are not destroyed by overheating or underheating.

Another object is to produce a device of the character described in which the maximum simplicity of construction and operation is secured.

Other objects and advantages will appear as the nature of the improvements is better understood, the invention consisting substantially in the novel arrangement and co-relation of parts herein fully described, and illustrated in the accompanying drawing, wherein similar reference characters are used to describe corresponding parts throughout the several views, and then finally pointed out and specifically defined and indicated in the appended claims.

The disclosure made the basis of exemplifying the present inventive concept suggests a practical embodiment thereof, but the invention is not to be restricted to the exact details of this disclosure, and the latter, therefore, is to be understood from an illustrative, rather than a restrictive standpoint.

The inventive idea involved is capable of receiving a variety of mechanical expressions, one of which, for the purpose of illustration, is shown in the accompanying drawing, in which—

Figure 1 is a perspective view partly in section of a pair of steel plates showing my improved rivet applied thereto;

Fig. 2 is a perspective view of the shell or female portion of the rivet;

Fig. 3 is a side view of one section of the shell;

Fig. 4 is a perspective view of the male or bolt portion of the rivet and also showing in dot and dash lines the bolt expansion member at the time of insertion and before driving same home; and Fig. 5 is a perspective view of the said expansion member.

Referring now to the drawing in detail, 5 and 6 denote respectively an upper and lower plate, the upper plate being provided with an opening or hole 7 which is countersunk at 8 and the lower plate is shown as provided with a hole 9 countersunk at 10. It is to be understood that the plates 5 and 6 may be of any length and provided with a multiplicity of openings, the openings in the upper plate being in alignment with the openings in the lower plate.

Fitting into the openings 7 and 9 is a sectional shell member 11 comprising two halves 12 and 13 each of the said halves being provided with central slots or cuts 14 and half cuts 15 spaced circumferentially from the said central cuts 14; the half cuts of one section of the shell aligning with the half cuts of the other section to form full cuts. Each shell section is further provided with half a head 16 which in the present instance is shown as being flat. Each head section is provided with a depression or hole 17 (see Fig. 1) and a pin or extension 18, the pin 18 of one section being adapted to fit into the hole 17 of the other section to unite the two shell sections into a unitary structure and to prevent relative movement between the said sections.

A bolt 20 extends into the shell 11 and is preferably provided with a round head 21 from which extends a tapered shank portion 22 ending in a cylindrical end portion 23 having slots 24 dividing the said cylindrical end into a central portion 25 and end portions 26 which are adapted to be expanded by an expansion member 27 having a pair of wedge-shaped legs or extensions 28 emanating from a cross bar or base 29.

In practice the plates 5 and 6 are placed one over the other with the holes 7 and 9 in alignment, a shell 11 is then dropped into the said openings after which the bolt 20 with the expansion member 27 in place in the slots 24 is inserted into the shell and driven home while the shell 11 is being held in place by a hammer. It will be seen that during the riveting operation the conical or tapering portion 22 will open up or expand the end sections 30 of the shell 11 and the expansion member 27 whose base 29 is held in abutment with the surface 31 of the tapered opening 32 in the head 16 of the shell 11 will expand the end sections 26 of the bolt 20, thus anchoring the shell in the plate 6 and the bolt 20 in the shell 11.

From the foregoing it will be seen that I have provided a highly practical and labor- and time-saving bolt which may be riveted cold and used wherever in ship building or other structural steel work rivets are used.

Having described my invention, what I claim as new and desire to secure by Letters Patent is:

1. In an expansion rivet, a female shell member comprising two half shell sections longitudinally split at one end, a head section at the opposite end having a tapered recess therein, a male member, a head thereon, a conical shank portion extending therefrom for expanding the split end of the shell, a longitudinally slotted cylindrical shank portion extending from the conical shank portion, and an expansion member for engagement with the slotted shank portion of the bolt and bottom of the tapered recess in the shell to expand the said shank within the shell.

2. In an expansion rivet, a female shell member comprising two half shell sections longitudinally split at one end, a head section at the opposite end having a tapered recess therein, a depression and pin connection for uniting the two shell sections, a male member, a shank thereon slotted at one end, means at the opposite end for expanding the split shell end, and means in operative engagement with the bottom of the tapered recess in the shell and the slotted shank portion of the bolt for expanding same within the interior of the shell.

3. In an expansion rivet, a female shell member comprising two half shell sections longitudinally split at one end, a head section at the opposite end having a tapered recess therein, a depression and pin connection for uniting the two shell sections, a male member, a shank thereon having a pair of longitudinal spaced apart slots at one end, a tapered portion at the opposite end of the bolt for expanding the split end of the shell, and an expansion member adapted to engage the slots in the said shank portion of the bolt for expanding same within the interior of the shell when the male member is driven home into the shell.

4. An expansion rivet comprising a shell split at one end, a head section at the opposite end having a tapered recess therein, a bolt, a head thereon, a conical shank portion extending therefrom for expanding the split end of the shell, a longitudinally slotted cylindrical shank portion extending from the conical shank portion, and an expansion member for engagement with the slotted shank portion of the bolt and bottom of the tapered recess in the shell to expand the said shank within the shell.

ARTHUR A. KIRLEY.